June 28, 1932. H. L. BEACH 1,865,298
DISPLAY RACK
Filed Oct. 9, 1930
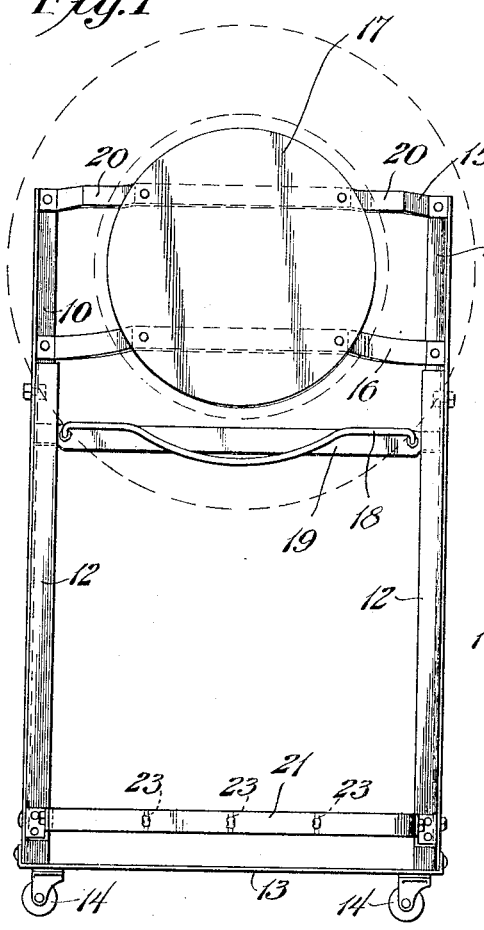
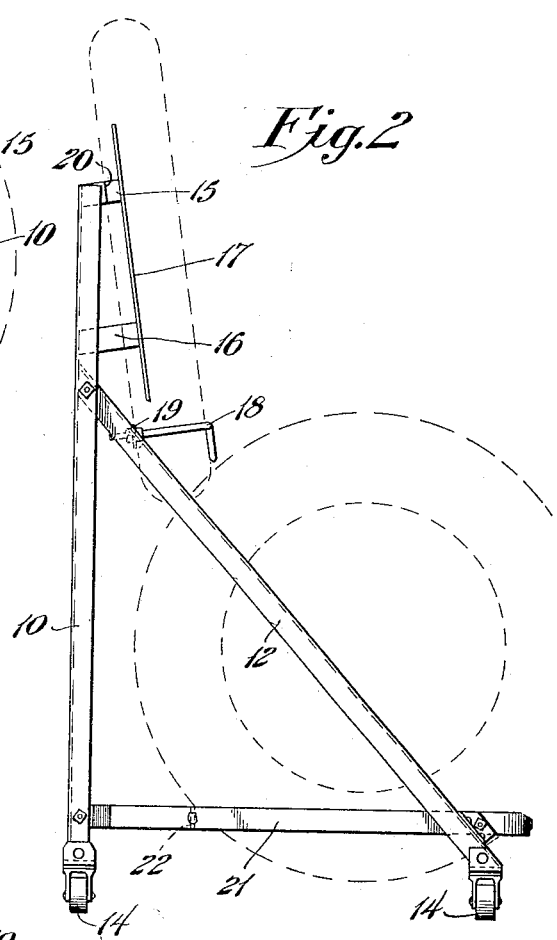
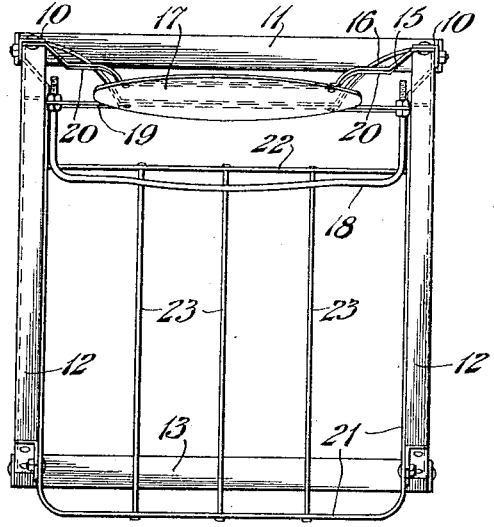
INVENTOR
H. L. Beach
BY Siggers & Adams
ATTORNEYS Patented June 28, 1932

1,865,298

UNITED STATES PATENT OFFICE

HARRY L. BEACH, OF COSHOCTON, OHIO

DISPLAY RACK

Application filed October 9, 1930. Serial No. 487,619.

This invention relates to display racks and aims to provide an improved collapsible metal rack for displaying automobile tires. It provides certain important improvements on the rack disclosed in my co-pending application, Serial No. 451,048 filed May 9, 1930.

In the accompanying drawing, showing an illustrative embodiment of the invention, Fig. 1 is a front elevation of a rack;

Fig. 2 is a side elevation of the rack shown in Fig. 1; and

Fig. 3 is a top plan view.

Referring particularly to the drawing, the rack there shown is of the easel type and has a rear frame composed of uprights 10 which are conveniently made of small structural angles. These uprights are conveniently connected at their lower ends by a cross brace 11.

A pair of supporting legs 12, also conveniently made of structural angles, are connected to the uprights 10 near their upper ends and project forwardly at an angle to the uprights. These legs are likewise connected by a lower cross bar or brace 13 conveniently made of strap metal and suitably secured to the flanges of the structural angles. The arrangement is such that the legs 12 can easily be disconnected from the uprights so that the entire rack can be shipped collapsed, to fit in a relatively small crate or package. To make the rack portable so that it can be moved about a shop floor, the legs conveniently have casters 14 swivelly connected to their lower ends.

The upper ends of the uprights 10 are here shown as being connected by spaced cross bars or brace members 15 and 16 conveniently made of strap metal and riveted or otherwise secured to the flanges of the structural angles. These cross bars are bent forwardly and are arranged to support an advertising sign in the form of a metal disk 17 secured to two cross braces. As the diameter of disk 17 is less than the inside diameter of a tire, the disk may lie within a tire to be displayed at the top of the rack, said tire being supported by means of a rack 18 conveniently made of a U-shaped round rod or bar having its legs secured to a cross bar 19 between the front legs 12. See Figs. 1 and 2. The upper cross bar 15 is shown as being bent to provide a flat portion 20 behind the plane of the advertising disk so that the side wall of the tire will rest against this flat portion.

To support a plurality of tires in the lower portion of the rack between the front legs 12, there is shown a U-shaped rack member 21 having its legs secured at their rear ends to the uprights 10 and near their forward ends to the legs 12. This frame is shown as having a transverse bar 22 connected to the legs near their rear ends and spaced rods or bars 23 are secured to the front portion of the frame and to the transverse bar to provide partitions between the tires and to support them in vertical planes. The distance between the front of the frame and the cross bar 22 is less than the diameter of the tires to be exhibited so that their treads are supported both at the front and the back of the frame. The construction and arrangement of the frame is such that it can easily be disconnected from the uprights 10 and the legs 12 for shipping purposes.

From the foregoing description, it will be seen that the improved rack is adapted to display to advantage both the treads and side walls or trade-mark portions of a plurality of tires. The arrangement is very compact and the device can be made of standard structural parts. Furthermore, it can be collapsed and shipped in a relatively small shipping space. The parts can easily be assembled by an inexperienced clerk or mechanic and the rack can be moved about on a shop floor or in a display window.

Obviously the present invention is not restricted to the particular embodiment thereof herein shown and described.

What I claim is:—

1. A tire display rack of the class described comprising, in combination, a frame having a pair of uprights; a pair of inclined front legs secured to the uprights; a rack extending across the upper portions of the inclined legs and having means to engage the periphery of a single tire and support it sidewise in the frame; and a fabricated rack connected to the lower ends of the uprights and the legs having means to support a plurality of tires side by side in vertical planes, and at right angles to the single tire.

2. A tire display rack comprising, in combination, a vertical frame having spaced uprights; forwardly and downwardly inclined legs connected to the uprights; a rack member adjacent the upper ends of said legs; cross braces at the upper end of the uprights adapted to support a single tire in an inclined position in said rack member; a horizontal rack at the lower end of the stand removably connected to the uprights and the legs; and division bars in the horizontal rack arranged to support a series of tires side by side between said legs.

3. A tire display rack comprising, in combination, a frame having legs; a tire supporting rack removably secured to the lower part of the frame and having means to support a series of tires edgewise in the frame; a rack member extending across the upper portions of the legs; and cross braces at the upper end of the frame adapted to support a single tire sidewise and in inclined position in the rack member.

4. A tire display rack comprising, in combination, a frame having a pair of uprights; a pair of inclined front legs secured to the uprights below their upper ends; a cross brace secured to the legs near their upper ends; a U-shaped member having its legs secured to the cross brace and adapted to support the lower portion of a tire sidewise; and cross braces secured to the uprights above the legs to support the mid portion of the tire in inclined position; and a rack having means to support a plurality of tires edgewise at the bottom of the frame.

In testimony, that I claim the foregoing as my own, I have hereto affixed my signature.

HARRY L. BEACH.